(12) United States Patent
Ryu et al.

(10) Patent No.: US 8,300,710 B2
(45) Date of Patent: Oct. 30, 2012

(54) NODE STRUCTURE FOR REPRESENTING TACTILE INFORMATION, AND METHOD AND SYSTEM FOR TRANSMITTING TACTILE INFORMATION USING THE SAME

(75) Inventors: Je-Ha Ryu, Gwangju (KR); Yeong-Mi Kim, Gwangju (KR); Jong-Eun Cha, Gwangju (KR); Yong-Won Seo, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 147 days.

(21) Appl. No.: 12/303,368

(22) PCT Filed: Mar. 3, 2008

(86) PCT No.: PCT/KR2008/001220
§ 371 (c)(1),
(2), (4) Date: Jul. 15, 2010

(87) PCT Pub. No.: WO2008/108573
PCT Pub. Date: Sep. 12, 2008

(65) Prior Publication Data
US 2010/0278512 A1 Nov. 4, 2010

(30) Foreign Application Priority Data
Mar. 2, 2007 (KR) .................. 10-2007-0020931

(51) Int. Cl.
*H04N 1/66* (2006.01)

(52) U.S. Cl. ......... 375/240.28; 375/240.24; 375/240.01; 375/240.02; 375/240.08; 382/239; 382/243; 382/232; 382/237

(58) Field of Classification Search ............. 375/240.28, 375/240.24, 240.01, 240.02, 240.08; 382/239, 382/243, 232, 237
See application file for complete search history.

(56) References Cited

U.S. PATENT DOCUMENTS

| | | | |
|---|---|---|---|
| 6,650,338 B1 * | 11/2003 | Kolarov et al. | 345/619 |
| 6,895,555 B1 * | 5/2005 | Ando | 715/719 |
| 7,073,127 B2 * | 7/2006 | Zhao et al. | 715/719 |
| 7,225,115 B2 * | 5/2007 | Jones | 703/7 |
| 2003/0097458 A1 * | 5/2003 | Bourges-Sevenier | 709/231 |

* cited by examiner

*Primary Examiner* — Shawn An (57) ABSTRACT

The present invention relates to a node structure for representing tactile information, and method and system for transmitting tactile information using the same. More particularly, the present invention relates to a node structure that represents tactile information for driving a tactile display device including an array of drivers as a tactile video, and to method and system for transmitting tactile information using the same. The invention provides a node structure for representing information for driving a driver array of a tactile display device. The node structure includes: a url field that indicates the position of the tactile video storing information on the driving strength of the driver array as intensity values of pixels! a start time field that indicates the playback start time of the tactile video; and a stop time field that indicates the playback stop time of the tactile video. In addition, the invention provides method and system for transmitting tactile information using the node structure.

4 Claims, 7 Drawing Sheets

```
TactileDisplay [ #%NDT=SFWorldNode exposedField    SFTextureNode      texture      NULL

| MovieTexture [ #%NDT=SFWorldNode,SFTextureNode,SFStreamingNode | | | |
|---|---|---|---|
| exposedField | SFBool | loop | FALSE |
| exposedField | SFFloat | speed | 1.0 |
| exposedField | SFTime | startTime | 0 |
| exposedField | SFTime | stopTime | 0 |
| exposedField | MFURL | url | [] |
| field | SFBool | repeatS | TRUE |
| field | SFBool | repeat | TRUE |
| eventOut | SFTime | duration_changed | |
| eventOut | SFBool | isActive | |
| ] { | | | |
| } | | | |

[Figure 4]

| TactileDisplay [ #%NDT=SFWorldNode | | | |
|---|---|---|---|
| exposedField | SFTextureNode | texture | NULL |
| ]{} | | | |

[Figure 5]

```
Group {
        TactileDisplay {
                texture MovieTexture {
                        url "tactile_video.avi"
                        startTime 3
                        stopTime 7
                }
        }
}
```

[Figure 6]

| TactileDisplayTexture {#%NDT=SFWorldNode,SFStreamingNode | | | |
|---|---|---|---|
| exposedField | SFBool | loop | FALSE |
| exposedField | SFTime | startTime | 0 |
| exposedField | SFTime | stopTime | 0 |
| exposedField | MFURL | url | [] |
| eventOut | SFBool | isActive | |
| } | | | |

NODE STRUCTURE FOR REPRESENTING TACTILE INFORMATION, AND METHOD AND SYSTEM FOR TRANSMITTING TACTILE INFORMATION USING THE SAME

TECHNICAL FIELD

The present invention relates to a node structure for representing tactile information, and method and system for transmitting tactile information using the same. More particularly, the present invention relates to a node structure that represents tactile information for driving a tactile display device including an array of drivers as a tactile video, and to method and system for transmitting tactile information using the same.

BACKGROUND ART

Human beings recognize the surrounding environment using the five senses, such as sight, hearing, smell, state, and touch. Among the five senses, the human being mainly depends on the senses of sight and hearing to acquire information on the surrounding environment. However, in many cases, actually, the human being depends on tactile information to acquire information on the surrounding environment. The sense of touch is used to determine the position, shape, texture, and temperature of an object. Therefore, it is necessary to provide tactile information as well as visual information and auditory information in order to transmit realistic feeling. Therefore, in recent years, haptic technology for providing tactile information together with visual information and auditory information to enable the user to directly interact with a scene on the screen in the fields of education, training, and entertainment has drawn great attention.

The haptic technology provides various information of the virtual or actual environment to the user through tactile feeling and kinesthetic feeling. The term 'haptic' is the Greek language meaning the sense of touch, and includes the meaning of tactile feeling and kinesthetic feeling. The tactile feeling provides information on the geometrical shape, roughness, temperature, and texture of a contact surface through skin sensation, and the kinesthetic feeling provides information on a contact force, flexibility, and weight through the propriocetive sensation of muscle, bone, and joint.

In order to provide the tactile information to the user, the following processes are needed: a process of acquiring tactile information; a process of editing or synthesizing the tactile information with, for example, image information; a process of transmitting the edited tactile information and image information; and a process of playing back the transmitted tactile information and image information.

In recent years, many researches on haptic rendering methods of playing back tactile information and haptic devices for displaying the tactile information have been conducted. However, there has not been sufficient research on a technique for acquiring or editing the tactile information and a technique for transmitting the tactile information.

International Publication No. WO2004/003717 discloses a method of calculating a time delay and synchronizing tactile information with image information in connection with the transmission of the tactile information. In addition, Korean Patent Unexamined Publication No. 10-2005-0045700 discloses a technique for synchronizing video/audio packet signals with tactile packet signals and transmitting the packet signals through a multiplexing module. Further, U.S. Published Application No. 2006-129719 discloses a technique for outputting a haptic effect in association with a time slot to assign time and order to the haptic effect signal, thereby outputting the haptic effect with time. U.S. Pat. No. 6,101,530 discloses a technique for transmitting an HTML file including tactile information over a network supporting TCP/IP protocols.

However, the disclosed techniques have difficulties in effectively displaying and transmitting the tactile information. In particular, the disclosures do not have sufficient techniques for encoding the tactile information, combining the tactile information with image information, and transmitting the combined information.

Meanwhile, a kinesthetic display apparatus, such as the PHANToM™ made by SensAble Technologies, Inc., has been generally used to provide haptic information. The kinesthetic display apparatus can display the texture, friction, and shape of a virtual object using a motor or a mechanical structure, such as an exo-skeletal structure. However, the kinesthetic display apparatus is incapable of directly providing information on the skin of the user, and the end-effect of the kinesthetic display apparatus is provided to the user by a pen or a thimble for feeling force. The kinesthetic display apparatus is expensive.

DISCLOSURE

Technical Problem

The invention has been made in an effort to solve the above problems, and an object of the invention is to provide a node structure in an MPEG-4 environment that is capable of forming tactile information for driving a tactile display device including an array of drivers as a tactile video and representing the tactile information together with media information.

Another object of the invention is to provide a method of forming tactile information for driving a driver array as a tactile video and representing the tactile information together with audio and video media information.

Still another object of the invention is to provide a method and system for transmitting tactile information and audio and video media information generated by the node structure and method for representing tactile information.

Technical Solution

In order to achieve the above objects, according to an aspect of the invention, there is provided a node structure for representing information for driving a driver array of a tactile display device. The node structure includes: a url field that indicates the position of the tactile video storing information on the driving strength of the driver array as intensity values of pixels; a start time field that indicates the playback start time of the tactile video; and a stop time field that indicates the playback stop time of the tactile video.

In the node structure according to the above-mentioned aspect, the node structure may be defined to be included in a binary format for scenes (BIFS) of an MPEG-4 standard.

According to another aspect of the invention, there is provided a method of representing tactile information for driving a driver array of a tactile display device as a tactile video including intensity values of pixels and transmitting the tactile video together with media information, such as audio or video information. The method includes the steps of: aligning the time axis of the tactile video with the time axis of the media to set the playback start time and the playback stop time of the tactile video; setting the position of the tactile video; and storing information on the playback start time, the playback stop time, and the position of the tactile video in a node included in a binary format for scenes.

According to still another aspect of the invention, there is provided a system for transmitting tactile information for driving a driver array of a tactile display device together with media information, such as audio or video information. The system includes: an object data generating unit 110 that generates a tactile video representing the driving strength of the driver array as intensity values of pixels, on the basis of the media information, and generates a binary format for scenes that sets the temporal positions of the tactile video and the media information; an encoder unit 120 that encodes object data generated by the object data generating unit 110; and a multiplexer 130 that multiplexes information encoded by the encoder unit to generate one stream file.

In the system for transmitting tactile information according to the above-mentioned aspect, the binary format for scenes may include a node structure for representing tactile information that includes a url field that indicates the position of the tactile video, a start time field that indicates the playback start time of the tactile video, and a stop time field that indicates the playback stop time of the tactile video.

A stream file generated by the system for transmitting tactile information may be transmitted to a receiver side through a transmission channel, and then decoded. The tactile display device may control the driving of the drivers on the basis of the playback start time and the playback stop time of the tactile video included in the binary format for scenes, and the intensity values of the pixels of the tactile video.

According to yet another aspect of the invention, there is provided a method of transmitting tactile information for driving a driver array of a tactile display device together with media information, such as audio or video information. The method includes the steps of: (a) generating a tactile video representing the driving strength of the driver array as intensity values of pixels, on the basis of the media information, and generating a binary format for scenes that sets the temporal positions of the tactile video and the media information; (b) encoding the media information, the tactile video, and the binary format for scenes; and (c) multiplexing the encoded information to generate a stream file.

Advantageous Effects

As described above, according to the above-mentioned aspects of the invention, it is possible to provide a new node structure in an MPEG-4 environment that is capable of representing the driving strength of drivers arranged in an array in the form of a tactile video, effectively combining tactile video information with media information, such as audio or video information, and displaying the combined information.

Therefore, the invention can be applied to various fields, such as realistic broadcasting, game, and education, by effectively transmitting tactile information together with media information to improve reality.

BEST MODE

Hereinafter, exemplary embodiments of the invention will be described in detail with reference to the accompanying drawings. First, it will be noted that the same components are denoted by the same reference numerals, even though the components are shown in different drawings. In the embodiments of the present invention, a detailed description of known device structures and techniques incorporated herein will be omitted when it may make the subject matter of the present invention unclear. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Figure 1:
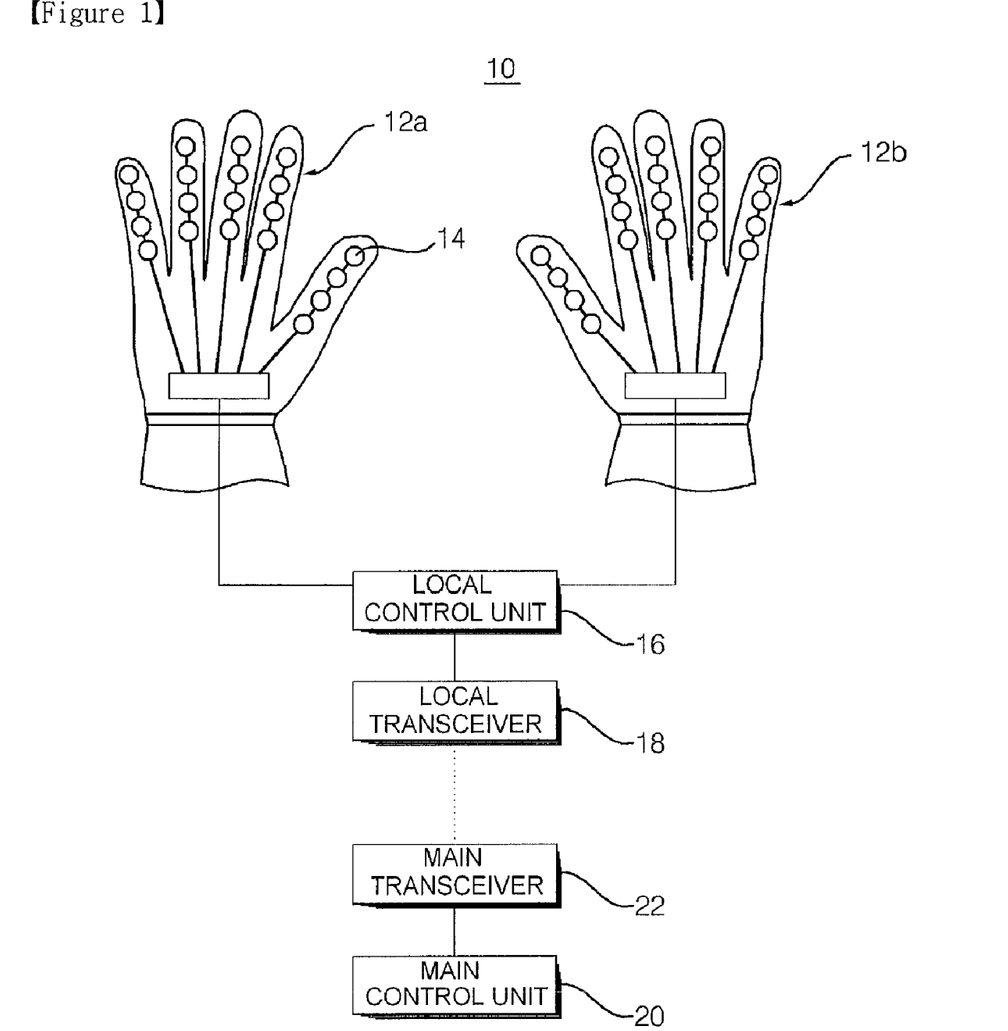
FIG. 1 is a diagram illustrating a tactile display device using drivers according to an embodiment of the invention.

FIG. 1 is a diagram illustrating a tactile display device using drivers according to an embodiment of the invention.

A tactile display device 10 according to this embodiment of the invention includes tactile display units 12a and 12b each having a plurality of drivers 14, a local control unit 16 that controls the drivers 14, and a local transceiver 18 that transmits/receives control signals for controlling the drivers 14 and transmits the control signals to the local control unit 16. The tactile display device 10 further includes a main control unit 20 that generates the control signals for controlling the drivers 14 and a main transceiver 22 that transmits the control signals generated by the main control unit 20 to the local transceiver 18 of the tactile display device 10.

The main control unit 20 generates the control signals for controlling the drivers 14 and transmits the control signals to the local control unit 16 through the main transceiver 22 and the local transceiver 18. The local control unit 16 controls the driving of the drivers 14 on the basis of the control signals. The main transceiver 22 and the local transceiver 18 may be connected to each other by cables or a wireless communication link, such as Bluetooth.

In FIG. 1, the tactile display units 12a and 12b are implemented in glove shapes such that the user can put on the gloves, but the invention is not limited thereto. The tactile display units 12a and 12b may be implemented in various shapes. The tactile display units 12a and 12b may be implemented in any shapes other than the glove shapes that can be worn on the user's head, arm, leg, back, or waist, such as in shoe shapes or hat shapes.

The drivers 14 provided in the tactile display units 12a and 12b may be a vibrotactile stimulation type or a pneumatic tactile stimulation type. The driver 14 of the vibrotactile stimulation type may be composed of an eccentric motor or a piezoelectric element. The driver 14 of the pneumatic tactile stimulation type may be composed of a nozzle that supplies air.

It is possible to control the driving of each of the drivers 14 by specifying driving strength. Therefore, it is possible to display tactile information to the user by transmitting information on the driving strength of each of the drivers 14 through the local control unit 16. The main control unit 20 transmits the information on the driving strength of each of the drivers 14 to the local control unit 16. In the invention, information on the driving strength of each of the drivers 14 is transmitted in the form of a tactile video to the main control unit 20, and the main control unit 20 converts each pixel value into driving strength whenever each frame of the tactile video is changed, and transmits the driving strength to the local control unit 16.

Figure 2:
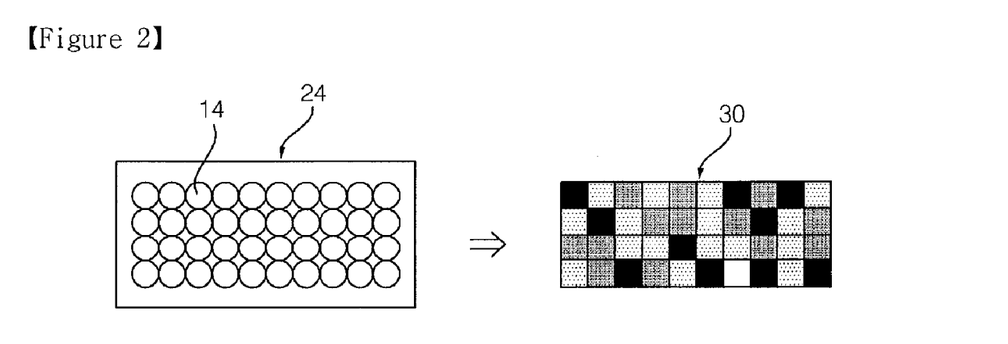
FIG. 2 is a diagram illustrating a driver array and a tactile video corresponding thereto according to the embodiment of the invention.

FIG. 2 is a diagram illustrating a driver array and a tactile video corresponding thereto according to the embodiment of the invention.

In FIG. 1, the left tactile display unit 12a and the right tactile display unit 12b each include 4 by 5 drivers 14, that is, a 4-by-10 driver array 24 is provided. That is, a combination of the drivers 14 shown in FIG. 2 can be represented by a rectangular array. A tactile video 30 is composed of pixels corresponding to the drivers 14.

Each of the pixels of the tactile video 30 includes intensity information of the pixel, and the intensity information corresponding to the driving strength of the driver corresponding to the pixel. When the tactile video 30 is represented by a black and white video with grayscale levels, each pixel has intensity information in the range of 0 to 255, and the drivers are driven on the basis of the intensity information. For example, a driver corresponding to a white pixel is strongly driven, and a driver corresponding to a black pixel is weakly driven.

When the driver array 24 of the tactile display device 10 corresponds one-to-one to the pixels of the tactile video 30, the intensity information of the pixels correspond one-to-one with the driving strengths of the drivers. However, when the dimension of the tactile video 30 is larger than that of the driver array 24, mapping therebetween is performed according to the ratio between the dimensions. For example, when the tactile video 30 has a dimension of 320 240 and the driver array 24 of the tactile display device 10 has a dimension of 10 4, the size of the tactile video 30 is adjusted from 320 by 240 pixels to 10 by 4 pixels such that the tactile video 30 corresponds one-to-one with the driver array 24. In this case, the intensity information of the tactile video 30 having the adjusted size is obtained by averaging the intensity information of the pixels before the size adjustment.

Since the format of the tactile video 30 is the same as that of a general color or black and white video, the tactile video can be transmitted by general video encoding and decoding methods. In addition, the tactile video 30 is composed of a plurality of frames, and the intensity information of the pixels in each frame corresponds to the driving strength of each of the drivers in the tactile display device 10.

The tactile information is transmitted together with general media (audio and video) information. Next, a description will be made of a node structure for transmitting tactile information represented in a tactile video format together with media information, and method and system for transmitting the information.

An MPEG-4 standard transmits information for representing an object through a plurality of elementary streams (ES). The mutual relation between the elementary streams (ES) and information on the configuration of a link are transmitted by object descriptors defined by the MPEG-4 standard. In general, an initial object descriptor (IOD), a binary format for scenes (BIFS), an object descriptor, and media data are needed to form a scene on the basis of the MPEG-4 standard. The initial object descriptor (IOD) is information to be transmitted first in order to form an MPEG-4 scene. The initial object descriptor describes the profile and the level of each medium, and includes elementary stream (ES) descriptors for a BIFS (binary format for scenes) stream and an object descriptor stream.

The object descriptor is a set of elementary stream descriptors that describe information of media data forming the scene, and connects the elementary streams (ES) of the media data and the scene. The binary format for scenes (BIFS) is information that describes the temporal and spatial relationships between the objects.

In the MPEG-4 standard, the binary format for scenes BIFS includes a MovieTexture node that defines a video object.

Figure 3:
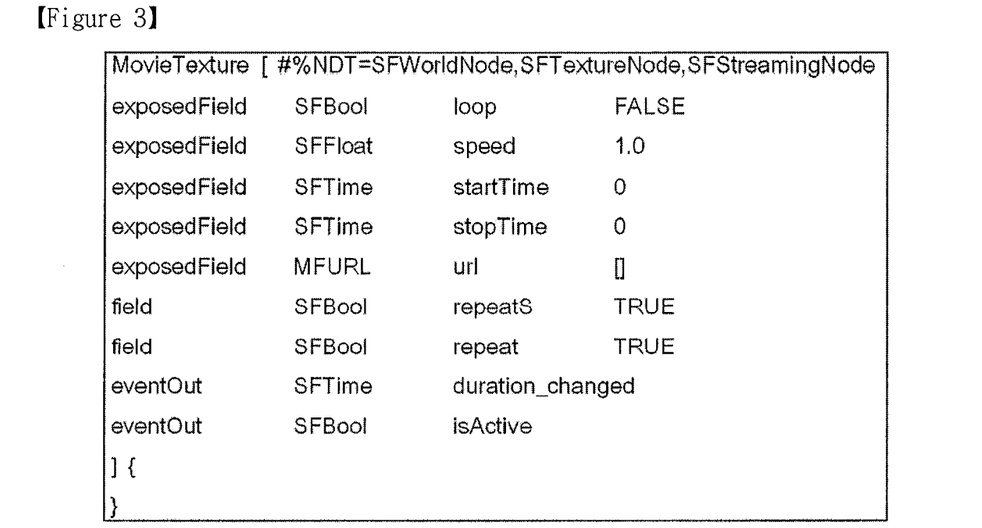
FIG. 3 is a diagram illustrating an example of a MovieTexture node of a binary format for scenes in an MPEG-4 standard.

FIG. 3 is a diagram illustrating an example of the MovieTexture node of the binary format for scenes in the MPEG-4 standard.

In the MovieTexture node shown in FIG. 3, "stratTime" indicates a video start time, and "stopTime" indicates a video stop time. In this way, it is possible to synchronize a video with another object. In addition, "url" sets the position of a video.

In the invention, a TactileDisplay node is defined in order to transmit a tactile video using the MovieTexture node of the binary format for scenes.

Figure 4:
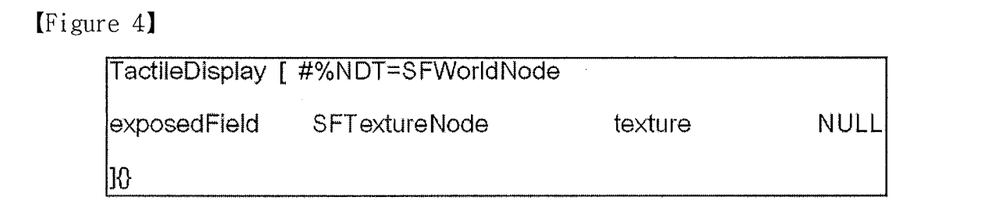
FIG. 4 is a diagram illustrating a TactileDisplay node for representing tactile information according to the embodiment of the invention.
Figure 5:
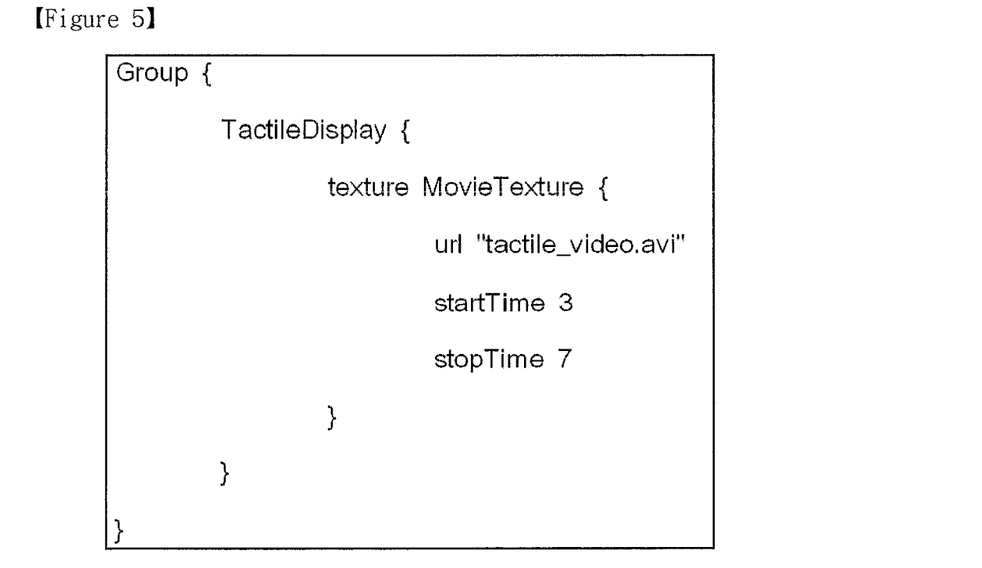
FIG. 5 is a diagram illustrating a process of connecting the TactileDisplay node to the MovieTexture node to define a tactile video object according to the embodiment of the invention.

FIG. 4 is a diagram illustrating the TactileDisplay node for representing tactile information according to the embodiment of the invention. FIG. 5 is a diagram illustrating a process of connecting the TactileDisplay node and the MovieTexture node to define a tactile video object according to the embodiment of the invention.

FIG. 4 shows that the TactileDisplay node is a kind of texture node. In FIG. 5, a "url" field indicates the position of a tactile video, a "stratTime" field indicates a start time, and a "stopTime" field indicates a stop time. That is, the MovieTexture node is connected to the texture field of the TactileDisplay node to define a tactile video object. In FIG. 5, the tactile video set as "tatile_video.avi" is played back for four seconds by the tactile display device three seconds after a play start instruction is input.

In FIGS. 4 and 5, the TactileDisplay node is defined as a kind of texture node, and the existing MovieTexture node is used to represent a tactile video object. However, the TactileDisplay node may be defined as a new texture node as follows.

Figure 6:
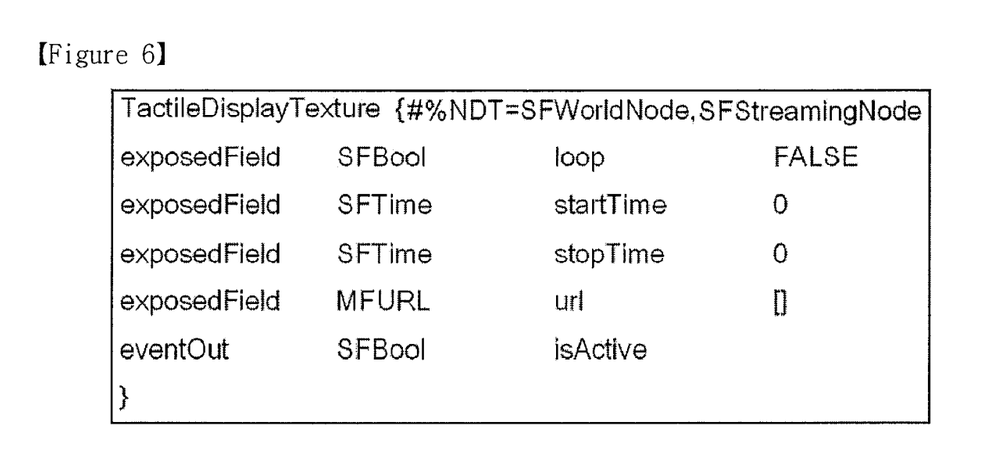
FIG. 6 is a diagram illustrating a TactileDisplayTexture node for representing tactile information according to the embodiment of the invention.

FIG. 6 is a diagram illustrating a TactileDisplayTexture node for representing tactile information according to an embodiment of the invention.

Referring to FIG. 6, in the binary format for scenes (BIFS) of the MPEG-4 standard, a TactileDisplayTexture node for transmitting a tactile video is newly defined. "TactileDisplayTexture" defines the play start time and the play stop time of a tactile video file, and a "url" field indicates the position of the tactile video file.

Next, a description will be made of a method and system for transmitting tactile information and media information using the node structure that represents the tactile information.

Figure 7:
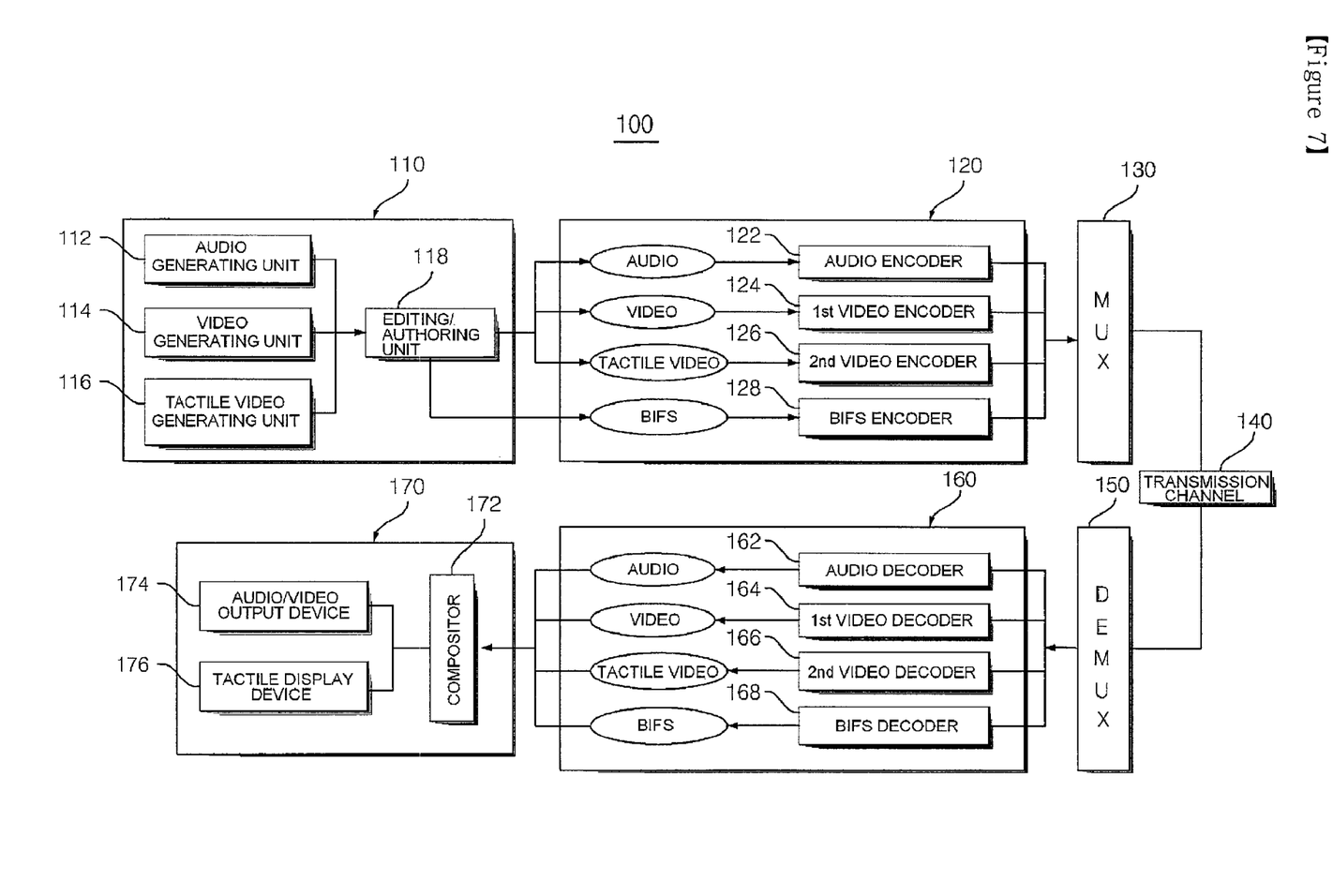
FIG. 7 is a block diagram illustrating a system for transmitting tactile information according to another embodiment of the invention.

FIG. 7 is a block diagram illustrating a system for transmitting tactile information according to an embodiment of the invention.

The system for transmitting tactile information according to the embodiment of the invention includes an object data generating unit 110, an encoder unit 120, a multiplexer (MUX) 130, a transmission channel 140, a demultiplexer (DEMUX) 150, a decoder unit 160, and a playback unit 170.

The object data generating unit 110 generates media (audio and video), generates a tactile video corresponding to the media, and edits or authors the tactile video. The audio generating unit 112 stores or generates an audio, and the video generating unit 114 stores or generates a video. The tactile video generating unit 116 generates a tactile video representing the driving strength of the driver array on the basis of the audio or the video.

The tactile video generating unit 116 may automatically generate the tactile video according to the kind of audio information or video information, or the user may manually generate the tactile video on the basis of the audio or the video.

Next, an example of the operation of the tactile video generating unit 116 generating the tactile video will be described.

The inventors conducted experiments to generate a tactile video for the tactile display device 10 shown in FIG. 1 using some scenes of the movie "Ghost" as an object.

Figure 8:
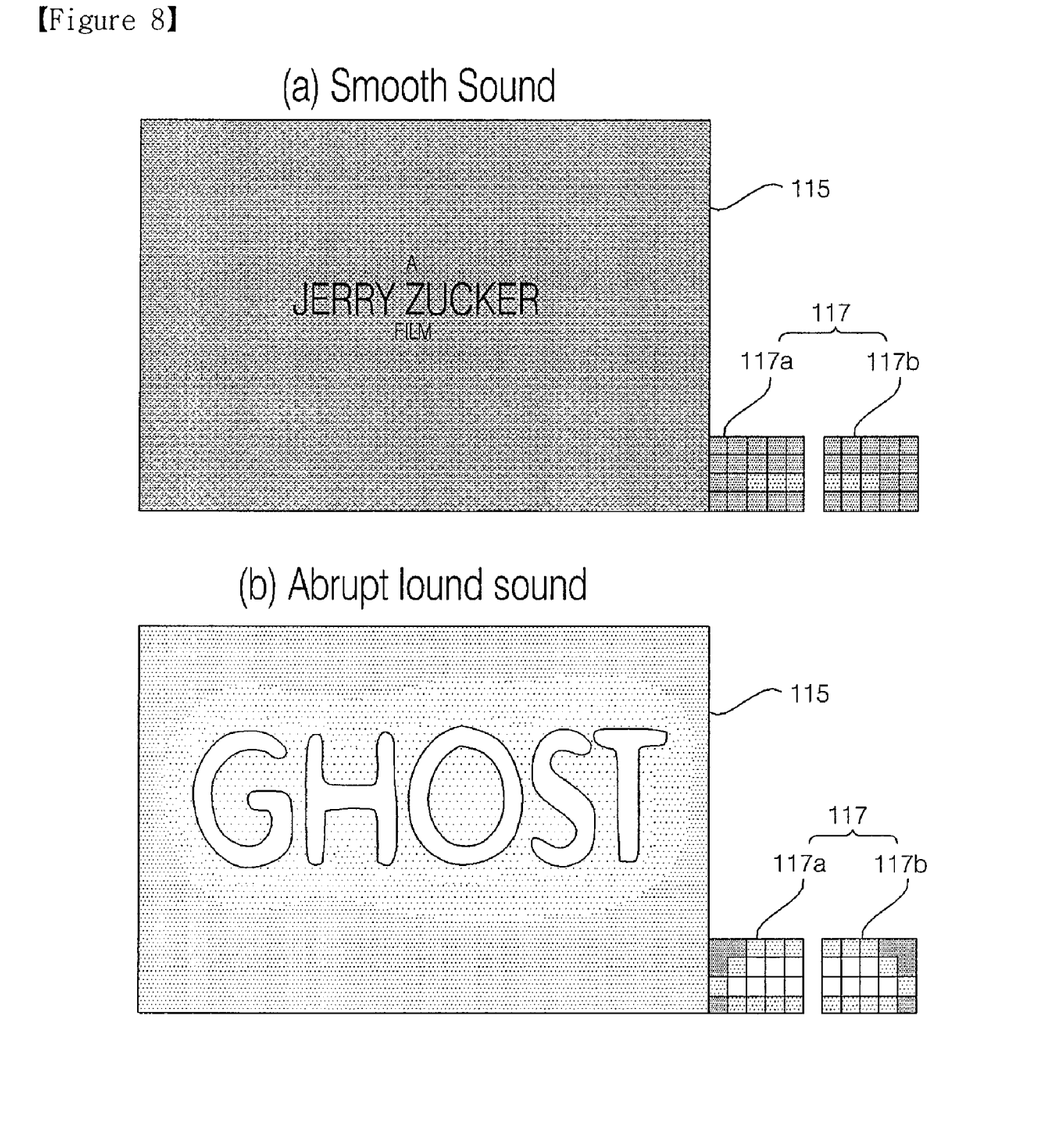
FIG. 8 is a diagram illustrating an example of a tactile video generated on the basis of an audio.

FIG. 8 shows an example of the tactile video generated on the basis of audio. In FIG. 8, (a) shows a tactile video generated for a smooth sound, and (b) shows a tactile video generated for an abrupt loud sound. FIG. 8 shows a tactile video 117 including a left tactile video 117a and a right tactile video 117b corresponding to a video frame 115. The intensity value of the tactile video for the smooth sound is set to be small, and the intensity value of the tactile video for the abrupt load sound is set to be large, such that the user can feel strong to the touch with an increase in the sound level.

Figure 9:
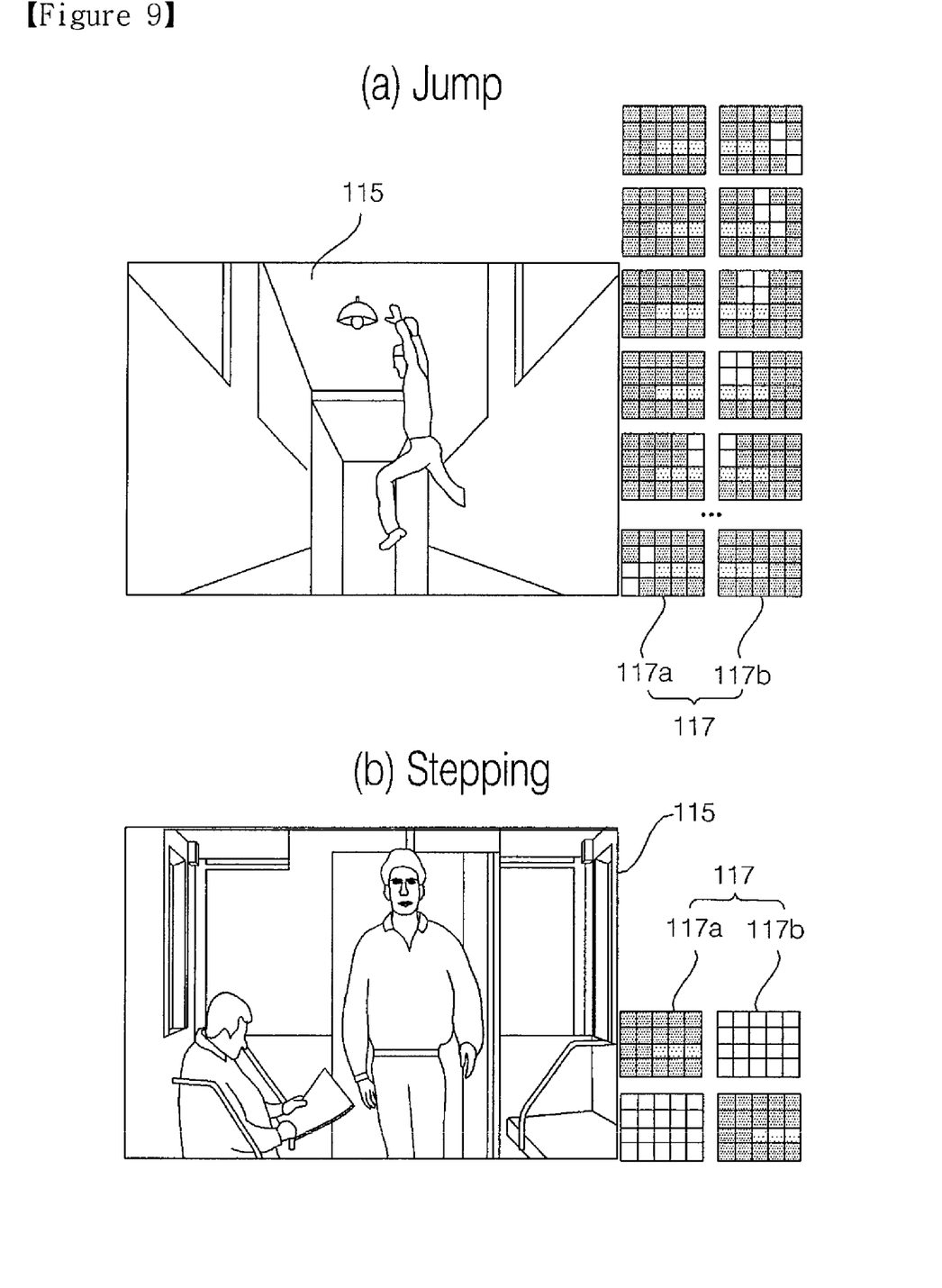
FIG. 9 is a diagram illustrating an example of a tactile video generated on the basis of a video.

Meanwhile, FIG. 9 shows an example of the tactile video generated on the basis of video. In FIG. 9, (a) shows a tactile video 117 in which the driving of the drivers is shifted from a right column to a left column as an actor moves from a right train to a left train on the screen. In FIG. 9, (b) shows a tactile video 117 in which the right drives and the left drivers are alternately driven as the actor walks on the screen.

Next, the configuration of the object data generating unit 110 will be described referring to FIG. 7 again.

The tactile video generated by the tactile video generating unit 116 is edited and authored with media (audio and video) information by an editing/authoring unit 118 so as to be aligned with the time axis. Then, the editing/authoring unit 118 generates a binary format for scenes according to the temporal and spatial positions of the audio, the video, and the tactile video. The invention is characterized in that the binary format for scenes additionally include a node for transmitting the tactile video, as described above.

The encoder unit 120 encodes the audio, the video, the tactile video, and the binary format for scenes. An audio encoder 122 encodes the audio, and a first video encoder 124 encodes the video. Meanwhile, the tactile video can be encoded by a general video encoding method since it corresponds to a kind of black and white video. The tactile video is encoded by a second video encoder 126. The binary format for scenes is encoded by a BIFS encoder 128. These encoding processes are performed by an MPEG-4 audio and video encoding method. The information encoded by the encoder unit 120 is multiplexed into one MP4 file by the multiplexer 130, and the MP4 file is transmitted through the transmission channel 140.

In the invention, it will be understood that the transmission channel 140 includes wire and wireless communication networks and it may be an IP Network, a DMB communication network, or an Internet network.

The MP4 file transmitted through the transmission channel 140 is demultiplexed by the demultiplexer 150 and then decoded into each information item by the decoder unit 160. The audio decoder 162 decodes the audio, and the first video decoder 164 decodes the video. The second video decoder 166 decodes the tactile video, and the BIFS decoder 168 decodes the binary format for scenes.

The information decoded by the decoder unit 160 is played back by the playback unit 170. The playback unit 170 includes a compositor 172, an audio-video output device 174, and a tactile display device 176. The compositor 172 temporally and spatially composes the transmitted objects, such as the audio, the video, and the tactile video, using information of the binary format for scenes (BIFS). On the basis of the information, the audio-video output device 174 outputs audio and video information, and the tactile display device 176 displays tactile information using the driver array.

Next, a method of transmitting tactile information using the tactile information transmission system will be described below.

Figure 10:
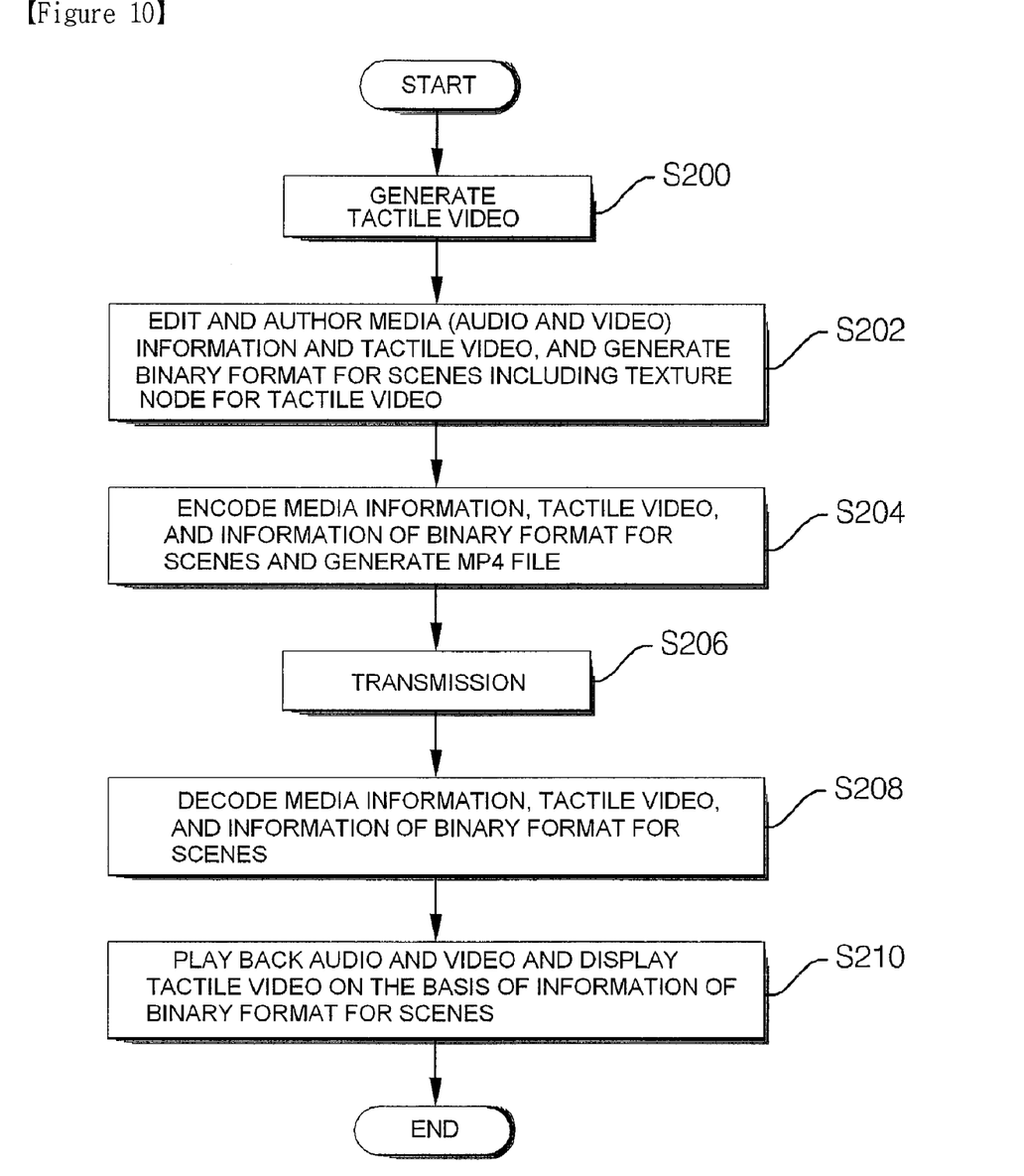
FIG. 10 is a flowchart illustrating a method of transmitting tactile information according to still another embodiment of the invention.

FIG. 10 is a flowchart illustrating a method of transmitting tactile information according to an embodiment of the invention.

First, the tactile video generating unit 116 generates a tactile video on the basis of media information, such as audio and video information (S200). Each of the pixels of the tactile videos includes an intensity value indicating the driving strength of a corresponding driver in the driver array 24 of the tactile display device 10. The tactile video may be automatically or manually generated on the basis of the audio or the video.

The editing/authoring unit 118 aligns the tactile video and the media information along the time axis. The editing/authoring unit 118 generates a binary format for scenes including information on the temporal and spatial positions of the media information and the tactile video (S202). The binary format for scenes includes a texture node for the tactile video, and the texture node for the tactile video includes a "startTime" field and a "stopTime" field for outputting the tactile video, and a "url" field indicating the position of the tactile video.

The encoder unit 120 encodes the media information, the tactile video information, and the information of the binary format for scenes, and the multiplexer 130 multiplexes the encoded information, thereby generating an MP4 file (S204).

The generated MP4 file is transmitted through the transmission channel 140 (S206).

The transmitted MP4 file is demultiplexed by the demultiplexer 150 and then decoded by the decoder unit 160 (S208).

The compositor 172 temporally and spatially composes an audio, a video, and a tactile video using the information of the binary format for scenes. The audio and the video are output from the audio-video output device 174, and the tactile information is displayed by the tactile display device 176. The tactile display device 176 shown in FIG. 8 may be the tactile display device 10 shown in FIG. 1, and the drivers of the driver array 24 are driven on the basis of the intensity values of the pixels of the tactile video.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects. The scope of the present invention is defined by the appended claims rather than by the description preceding them, and all changes and modifications that fall within meets and bounds of the claims, or equivalences of such meets and bounds are therefore intended to be embraced by the claims.

The invention claimed is:

1. A node structure for representing information for driving a driver array of a tactile display device, comprising:
   a url field that indicates a position of a tactile video storing information on a driving strength of the driver array as intensity values of pixels;
   a start time field that indicates a playback start time of the tactile video; and
   a stop time field that indicates a playback stop time of the tactile video,
   wherein the tactile video is represented by a grayscale level, and
   wherein the pixels of the tactile video are mapped to drivers of the driver array according to a dimension of the tactile video and a dimension of the driver array.

2. The node structure of claim 1,
   wherein the node is configured to represent tactile information, and
   wherein fields of a known MovieTexture node are used as the url field, the start time field, and the stop time field.

3. The node structure of claim 1,
   wherein the node structure is defined to be included in a binary format for scenes (BIFS) of an MPEG-4 standard.

4. A method of representing tactile information for driving a driver array of a tactile display device as a tactile video including intensity values of pixels and transmitting the tactile video together with media information, such as audio or video information, the method comprising the steps of:
   aligning a time axis of the tactile video with a time axis of the media information to set a playback start time and a playback stop time of the tactile video;
   setting a position of the tactile video; and
   storing information on the playback start time, the playback stop time, and the position of the tactile video in a node included in a binary format for scenes,
   wherein the tactile video is represented by a grayscale level, and
   wherein the pixels of the tactile video are mapped to drivers of the driver array according to a dimension of the tactile video and a dimension of the driver array.

* * * * *